United States Patent [19]

Haag et al.

[11] 4,301,513
[45] Nov. 17, 1981

[54] LOGIC STATE ANALYZER WITH RESTART AND STATE OCCURRENCE QUALIFICATION

[75] Inventors: George A. Haag, Colorado Springs; O. Douglas Fogg, Loveland; Gordon A. Greenley; Steve A. Shepard, both of Coloradao Springs, all of Colo.; F. Duncan Terry, Meridan, Id.

[73] Assignee: Hewlett-Packard Company, Palo Alto, Calif.

[21] Appl. No.: 41,362

[22] Filed: May 22, 1979

Related U.S. Application Data

[62] Division of Ser. No. 828,138, Aug. 29, 1977, abandoned.

[51] Int. Cl.³ .......................... G06F 3/153; G06F 7/00
[52] U.S. Cl. .................................................. 364/900
[58] Field of Search ........................ 364/900 MS File; 340/735, 739, 740

[56] References Cited

U.S. PATENT DOCUMENTS

| 3,675,230 | 7/1972 | Pitteway | 340/739 |
| 3,713,097 | 1/1973 | Linnerooth | 340/735 |
| 3,902,476 | 9/1975 | Hileman | 340/735 |
| 4,040,025 | 8/1977 | Morrill, Jr. et al. | 364/900 |
| 4,149,164 | 4/1979 | Reins et al. | 340/740 |
| 4,189,769 | 2/1980 | Cook et al. | 364/200 |

*Primary Examiner*—Harvey E. Springborn
*Attorney, Agent, or Firm*—Edward L. Miller

[57] ABSTRACT

A general purpose logic state analyzer selectively stores, formats and displays a digital signal representing a sequence of data states input thereto and provides a graphical display of the stored data states and a count of selected events occurring intermediate to the occurrence of the data states stored. Selective storage of the input data states is provided by comparing the input data states to a preselected sequence of first qualifier state conditions and enabling the storage of input data states in response to the satisfaction of the preselected sequence. Storage is further qualified by storing only data states which individually meet one of a preselected set of second qualifier state conditions. Selective formatting of the stored data states is provided by converting the stored data states in response to selectable assignments of contiguous sets of bits of each stored data state to logical fields, a selectable concatenation of the logical fields, and to radicies selected for each of the respective logical fields. The converted stored data states can be displayed as a formatted listing or as a graphical display. In the graphical display the stored data bits corresponding to a selected logical field are interpreted as a binary magnitude and plotted as the ordinate and the chronological storage location is plotted as the ordinate and the chronological storage location is plotted as the abscissa on a cartesian coordinate system. A count of selected events is obtained from the contents of a binary counter and stored in a second memory in parallel with the storing of each data state. This counter can be incremented selectively in response to either an internal clock or in response to the detection of an input data state satisfying a selected count-qualifier state condition.

4 Claims, 16 Drawing Figures

--------FORMAT SPECIFICATION---------TRACE-COMPLETE----------------------

CLOCK SLOPE [+]
(+,-)

```
         POD            POD4      POD3      POD2      POD1
         PROBE          7------0  7------0  7------0  7------0
LABEL ASSIGNMENT       |AAAAAAAA||AAAAAAAA||DDDDDDDD||XXXXXXXF|
  (A,B,C,D,E,F,X)       !!!!!!!!  !!!!!!!!  !!!!!!!!  !!!!!!!!
                                      ACTIVE CHANNELS
```

```
           LABEL            A     D     F
LOGIC POLARITY            [+]   [+]   [+]                 ▓▓▓  DESIGNATES A
    (+,-)                                                      SELECTABLE
NUMERICAL BASE           [HEX] [HEX] [BIN]                     ENTRY FIELD
  (BIN,OCT,DEC,HEX)                                       FIGURE 1
```

--------TRACE SPECIFICATION---------TRACE-COMPLETE----------------------

```
           LABEL     A     D   F   OCCUR
           BASE     HEX   HEX BIN   DEC

FIND IN SEQUENCE   [03CF] [XX] [X] [00002]
           THEN    [03E2] [XX] [X] [00003]
           THEN    [00E1] [XX] [X] [00001]
[START]    TRACE   [03E3] [XX] [X] [00001]

SEQ RESTART [ON]   [03E4] [XX] [X]
```

TRACE
```
[ONLY STATE]       [03E1] [XX] [X] [00001]
```

COUNT [STATE]      [03E1] [XX] [X]

FIGURE 2

------------TRACE LIST-----------------TRACE-COMPLETE-------------------

```
         LABEL    A     D    F   STATE COUNT
         BASE    HEX   HEX  HEX      DEC
                                    [REL]
SEQUENCE...03CF...5D...0...
SEQUENCE   03E2   A2   0            2
SEQUENCE   00E1   C6   0            3
  START    03E3   82   0            1
   +01  ...03E3...E1...0............|
   +02     03E3   E5   0            |
   +03     03E4   82   0            |
   +04     03E4   03   0            |
   +05  ...03E4...47...0............|
   +06     03E1   A2   0            |
   +07     03E1   1D   0            |
   +08     03E1   5D   0            |
   +09  ...03CE...5D...0............|
   +10     03CE   44   0            |
   +11     03E2   A2   0            |
   +12     03E2   C2   0            |
   +13  ...03E2...C6...0............|
   +14     00E1   C6   0            |
   +15     03E3   82   0            |
   +16     03E3   E1   0            |
```

```
----------TRACE COMPARE------------COMPARED TRACE-COMPLETE------------
        LABEL      A       D    F    COMPARED
         BASE     HEX     HEX  BIN   TRACE MODE
                                      [STOP]
      SEQUENCE...0000...00...0...
      SEQUENCE...0000    00    0
      SEQUENCE   0000    00    0
         START   0000    00    0
           +01 ...0000...00...0...
           +02    0000    00    0
           +03    0000    00    0
           +04    0000    00    0
           +05 ...0000...00...0...
           +06    0000    00    0
           +07    0000    00    0
           +08    0000    00    0
           +09 ...0000...00...0...
           +10    0000    00    0
           +11    0000    00    0
           +12    0000    00    0
           +13 ...0000...00...0...
           +14    0000    00    0
           +15    0000    00    0
           +16    0000    00    0
```

LOGIC STATE ANALYZER WITH RESTART AND STATE OCCURRENCE QUALIFICATION

CROSS REFERENCE TO RELATED APPLICATIONS

This application is a division of an earlier filed copending application of the same inventors and assignee, Ser. No. 828,138, filed Aug. 29, 1977, abandoned in favor of a continuing application Ser. No. 75,787 filed on Sept. 17, 1979, which in turn was abandoned in favor of a continuing application Ser. No. 210,462 filed on Nov. 25, 1980.

The subject matter of the present patent application is related to copending U.S. patent application Ser. No. 672,226 entitled LOGIC STATE ANALYZER filed Mar. 3, 1976, by Justin S. Morrill, Jr. et al., now U.S. Pat. No. 4,040,025 and is related to copending U.S. patent application Ser. No. 743,188 entitled DIGITAL PATTERN TRIGGERING CIRCUIT filed Nov. 19, 1976, by William A. Farnbach, now U.S. Pat. No. 4,100,532. These patents are expressly incorporated by reference.

BACKGROUND AND SUMMARY

Prior art logic analyzers provide merely for enabling the storage of input data states in response to a selected number of satisfactions of a single preselected qualifier state condition and for the storage of data states satisfying a second qualifier state condition. While requiring such multiple occurrences in the input data states prior to beginning a "trace" of data states is useful, it does not impose an occurence condition upon states to be stored as part of the actual trace. For both the reasons that memory is limited and that it is desirable to eliminate as much nonrelevant data from the trace as possible to make the analysis thereof less burdensome, it is often desirable to more thoroughly qualify the data stored as part of the trace itself. A useful way of doing this, particularly where loops are involved, is to require that a data state of interest occur a pre-selected number of times before it is stored. Of additional utility in this connection is the ability to restart the entire triggering sequence over upon the occurrence of a designated restart state.

The present invention incorporates multiple triggering circuits of the type described in the referenced patent application entitled DIGITAL PATTERN TRIGGERING CIRCUIT. These triggering circuits provide output signals in response to an input data state satisfying one of the pre-selected qualifier state conditions. A counter and related sequencing logic is coupled to a first set of triggering circuits to determine when the storage of input data states should be enabled. The various pre-selected qualifier state conditions can be required to occur a designated number of times. A separate triggering circuit provides a signal to the sequencing logic for restarting the enabling sequence in response to the detection of a restart state condition. Storage of data states is further qualified by a second set of triggering circuits. The output of this set is supplied to the memory such that only data states meeting one of the pre-selected state conditions are stored.

FORMAT SPECIFICATION

Figure 1:
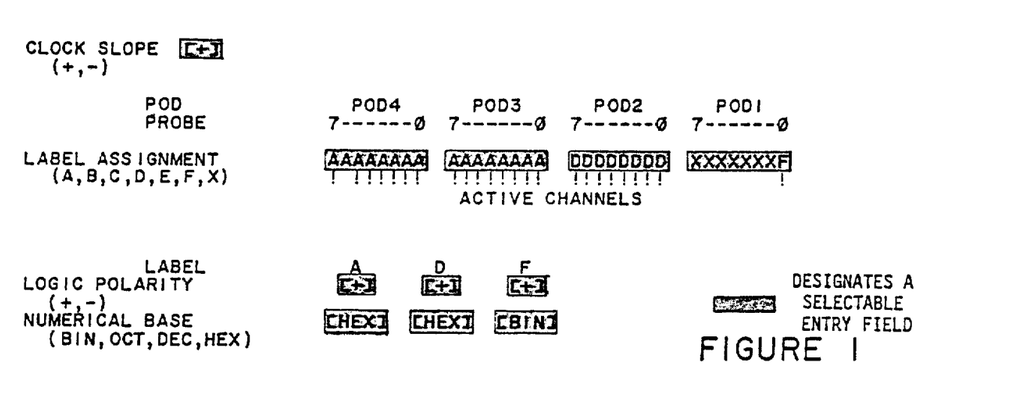
FIG. 1 illustrates the interactive format specification display.

Data formatting permits the partitioning of 32 input data channels into parameters of interest. Contigious data channels which behave as a single parameter may be assigned to one of six labels ( A-F). For example, In FIG 1, illustrating the interactive format specification display, 16 bits of an address bus have been assigned to label "A", 8 bits of a data bus have been assigned to label "D", 1 bit of data on pod 1 has been assigned to label "F", and 7 bits have been left unassigned (labeled "X"). Further specifications and data manipulations are made by referencing these labels. Each assigned label may be independently declared to have a positive or negative "logic polarity" and converted to an independently selected radix which can be binary, octal, decimal or hexedecimal. Further, the slope of the positive or negative clock transition at which time the input data channels are sampled can be selected ("clock slope").

Figure 15:
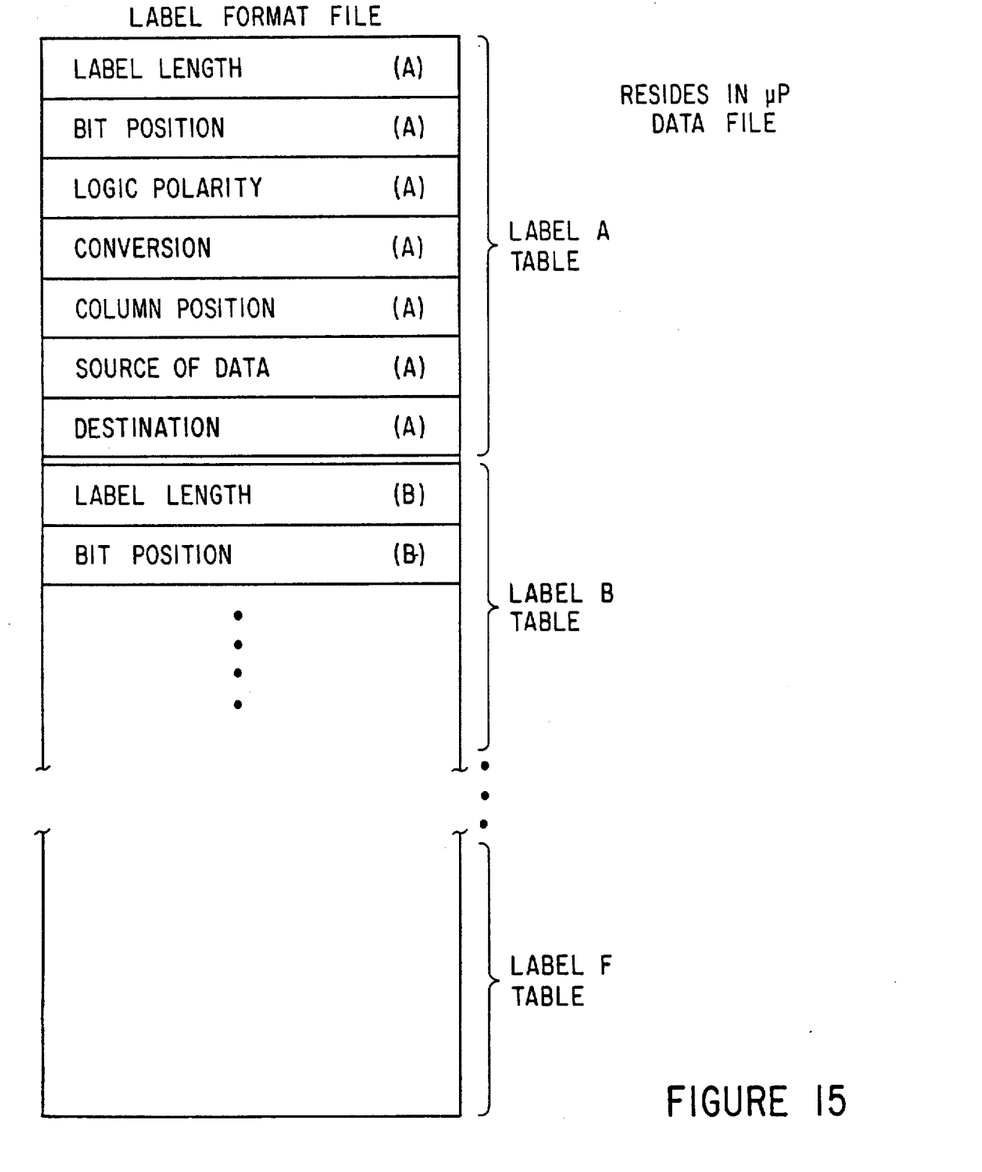
FIG. 15 illustrates the format of the label format file.
Figure 16:
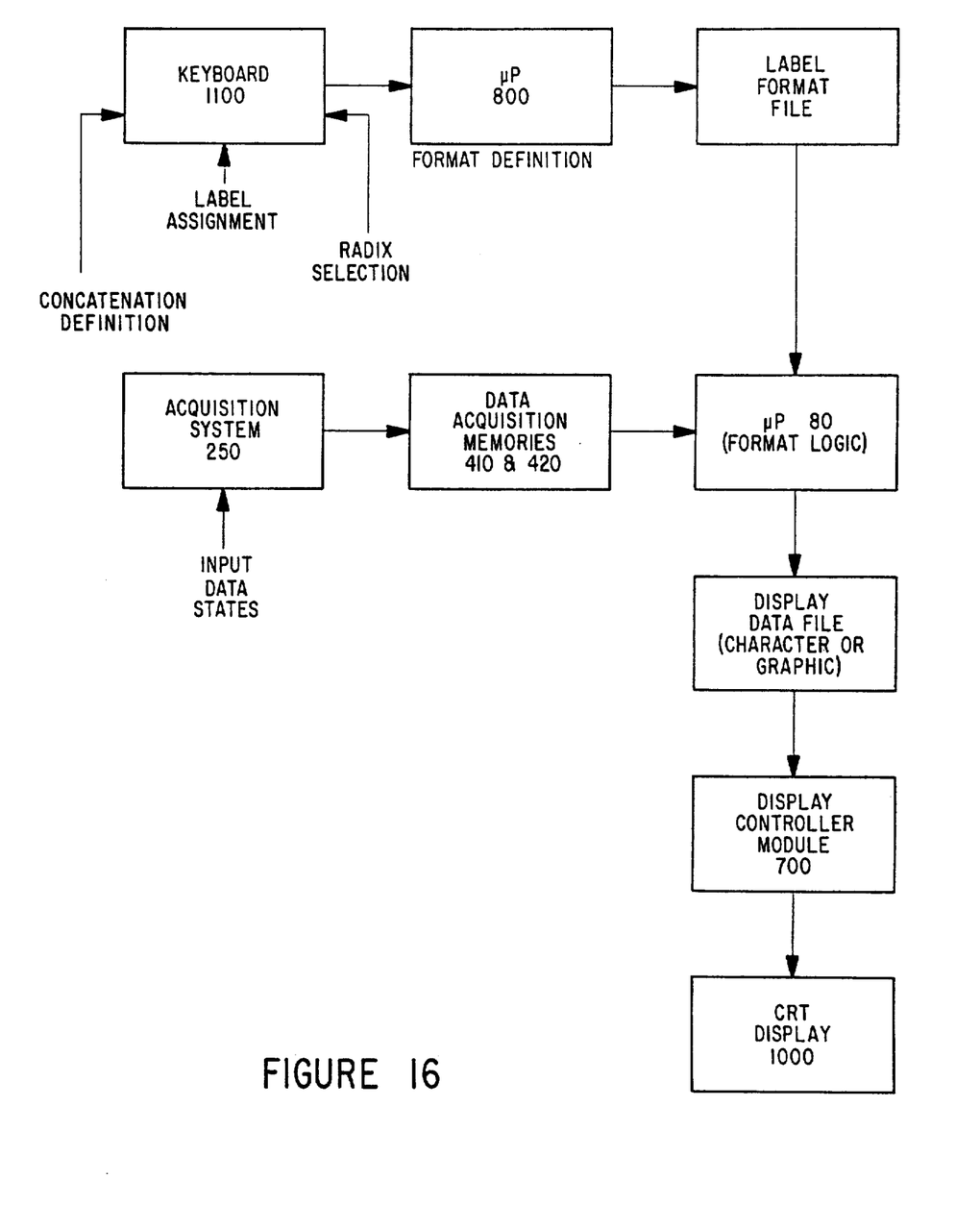
FIG. 16 illustrates the logic flow of the display formatting logic.

Keyboard entries to the microprocessor 800, as shown in FIG. 16, permit the construction of the label format file, shown in more detail in FIG. 15 which, contains the format specification parameters. This is used to process the stored data states in the construction of the alphabetically cancatenated ASCII display data file and the graphic display data file. Either of the display data files is subsequently selected and used for display purposes by the display control module 700 and the CRT display 1000.

TRACE SPECIFICATION

The assigned input data channels are sampled at the specified clock transitions and are treated as one sampled state. The trace specification defines which of the sampled states are to be stored for display and which sampled states are to be counted for count measurements. The trace specification comprises a definition of state conditions specifying the trace position, the selective trace, and the count measurement. Each state condition defines a state of the assigned input data channels in any combination of 1's, 0's, and /or X's (don't care). In octal, decimal or hexedecimal bases the definition is defined in terms of the appropriate alphamumerics and X's.

Figure 2:
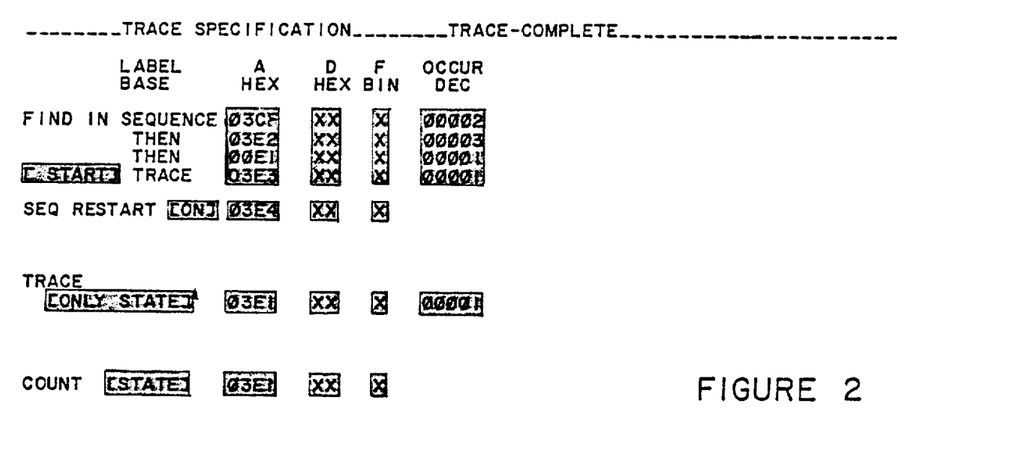
FIG. 2 illustrates the interactive trace specification display.

A trace position may be selected to a start, center or end the selective trace in response to the input data satisfying a predefined state sequence. In this description it will be assumed that the trace position starts the selective trace. A state sequence of up to seven state conditions must be satisfied in a specified order, ignoring intermediate states which do not satisfy the state sequence. The simplest state sequence is a single state condition. Specific segments of branched, looped or nested forms of state flow may be directly located by properly defined state sequences. In addition, each state condition in a state sequence may be specified to occur from 1 to 65536 times before the state condition is satisfied. This form of positioning will locate the nth pass of a loop beginning at a give state condition. Clock delay may be incorporated by defining the nth occurrence of any state (an all don't care state specification). The trace logic may also be specified to restart the satisfaction of the predefined state sequence if it is not satisfied before or concurrently with the location of a predefined restart state condition. A restart on "any state " requires that the state sequence be satisfied without any unspecified intermediate states. For example, FIG. 2 illustrates the interactive trace specification display for a trace position starting upon the satisfaction of 4 state conditions in sequence. A restart state condition is also defined.

The selective trace is a qualification of which sampled states will be stored for display. One to seven state conditions may be "OR" specified for collection. Selectively tracing only sampled states of interest eliminates the clutter of unneccessary states and magnifies the apparent size of the trace beyond its 64 terms. Also, an occurrence term may be specified so as to store only every nth satisfaction of an "OR" specified state condition. FIG. 2 illustrates the selective trace of every occurrence of a single state condition.

The count measurement performs a "time" or a "state" count associated with each of the (64) states stored and can be displayed in one of two formats:

absolute—the count from the trace positon relative—the count from the previous trace state

The time count is performed by counting the occurrences of an internal clock between sequentially stored states and the display is in the units of seconds. A state count similarly counts the number of occurrences of a specified state condition ("count") between sequentially stored states. For example, specifying "any state" would result in a count of the selected clock transitions of the input data. In FIG. 2, a state count is performed on the occurrences of a specified state condition intermediate to each sampled state stored.

INTERNAL MEASUREMENT STORAGE

One complete measurement of 64 sampled states, which includes the sampled states satisfying the state conditions defining the state sequence and specifications of the format, trace, and display, may be internally stored. The "current measurement" may be stored or exchanged with a "stored measurement " for later analysis. A "trace compare" (described more fully below) compares results of a previously stored trace with the current measurement and may be utilized as a further qualifier on data storage.

DISPLAY SPECIFICATION

The output display format of the current measurement may be selected from a trace list, a trace graph, or a trace compare.

Figure 3:
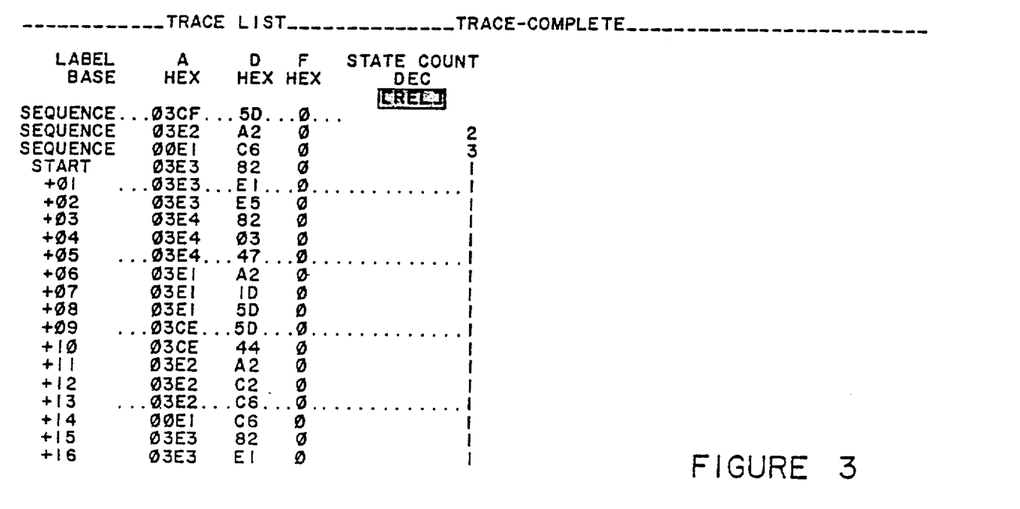
FIG. 3 illustrates a trace list display of the stored data states.

A trace list, illustrated in FIG. 3, displays a listing of the stored states in their order of occurence. Twenty trace states, (one per line) are simultaneously presented on the a CRT display. The "ROLL" keys allow scanning of the 64 stored states. Each line comprises a line number, the stored state alphabetically sorted into assigned labels in their numberical base, and the time or state count if selected.

Figure 4:
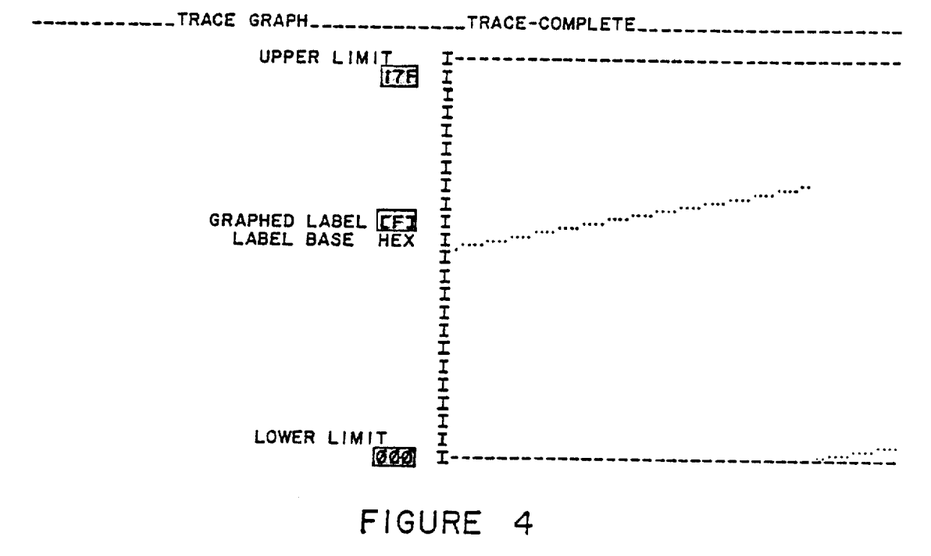
FIG. 4 illustrates a trace graph display of the stored data states.

A trace graph, as shown in FIG. 4, presents a graph of the data magnitude of a specified label versus the storage location for all 64 stored states. Each state is given a vertical displacement corresponding to its binary magnitude and an increasing horizontal displacement for successive states in order of their occurrence. The result is a waveform analogous to oscilloscope displays of voltage magnitude. The label to be graphed is selected by specifying the "graphed label". Scaling of state magnitude is controlled by specifying the "upper limit" and "lower limit " on the vertical axis. Limits can be specified directly or dynamically varied with logrithmic autoranging controls. These facilities allow any portion of a graph to be magnified to a full scale presentation. The 20 points corresponding to the lines viewed inthe trace list are intensified. The intensified poriton also responds to the "ROLL" controls, and their corresponding absolute value may be read in the trace list.

Figure 5:
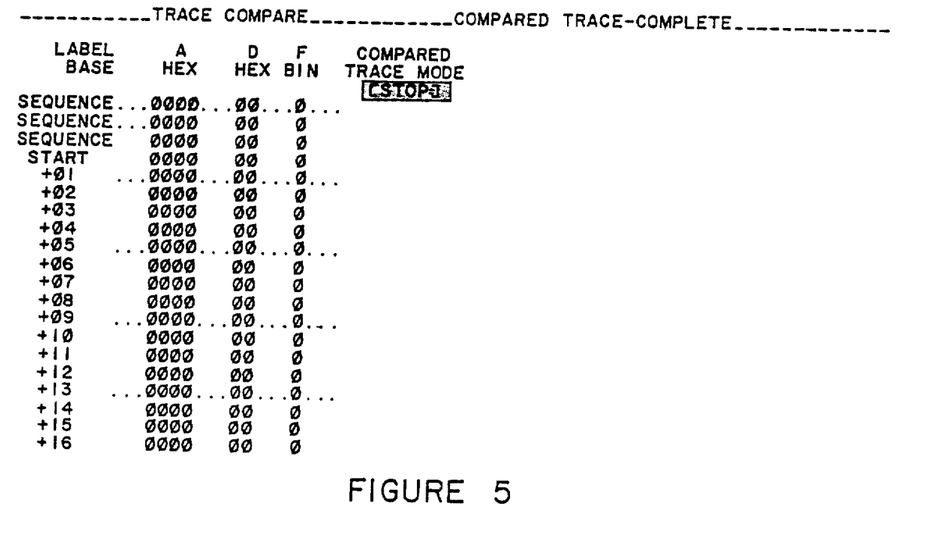
FIG. 5 illustrates a trace compare output display list.

A trace compare as illustrated in FIG. 5 presents a tabular listing of the difference between results in the "current measurement" and the data in the "stored measurement". The listing is formatted and rolled as in the trace list. The results of the two measurements are exclusive "ORED" such that identical corresponding bits are displayed as zeros and unequal bits are displayed as ones. In an octal base a "$\phi$3" is equivalent to a binary "$\phi\phi\phi$ $\phi$11" and indicates that the right two bits are different in the two measurements. Trace compare also offers a "compared trace" mode which reruns a measurement until the current and stored measurement are either equal or not equal. (STOP =, or STOP $\neq$) For example, in FIG. 5 of the instrument has rerun trace measurements until the "current measurement" equaled the "stored measurement", as indicated by the "STOP =" specification and revealed by the array of "0"'s in the comparison.

TRACE MODES

Three trace mode options are provided. "Trace" executes a single current measurement. "Continuous trace" repeats the execution of a current measurement continuously. "Compared trace" repeats the execution of a current measurement until the desired comparison with the stored measurement is obtained.

CLOCK ENABLE AND TRIGGER OUTPUTS

A trigger output provides a triggering pulse for external instrumentation such as oscilloscopes. A 50 ns pulse is generated each time the trace position is found. The clock enable output is useful for gating clocks or interrupting the device under test. A high signal level indicates that the instrument is actively searching for the trace position. It remains at the high signal level until the trace position has been found or the halt key is depressed. Both outputs are suspended when the format specification is displayed to allow measurement of channel activity.

KEYBOARD AND SPECIFICATION DESIGNATION

Figure 6:
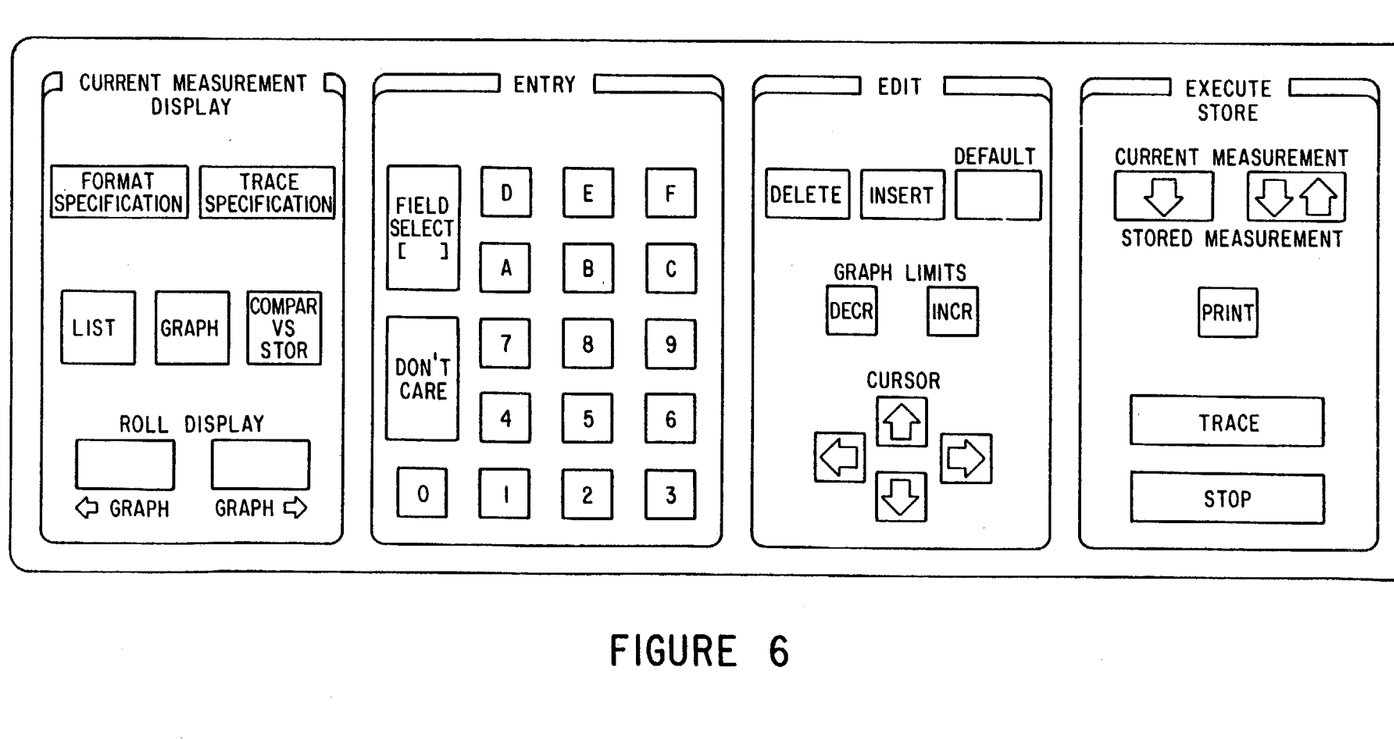
FIG. 6 illustrates the input keyboard.

Referring to FIG. 6, an illustration of the keyboard, the keys are functionally segregated into four blocks, the "current measurement display", "entry", "edit", and "execute". A power up sequence initially defines a default set of specifications, displays the default format specification, then automatically selects a hexadecimal trace list display. Activation of the "ROLL DISPLAY" keys permits the presentation of any portion of the 64 states stored. To change the format specification, the "FORMAT SPECIFICATION" key is pressed. The cursor keys in the edit block are used to move the cursor, designating a selectable entry field by a blinking inverse video field on the interactive display.

The trace specification can be edited by selecting the trace specification interactive display by activating the "trace specification" key. Editing is accomplished in the same manner as the format specification is edited. A general description of the functions of the individual keys is given in Appendix A (part of the file, not printed). A detailed description of the interactive display entry fields is given in Appendix B (part of the file, not printed).

DETAILED DESCRIPTION

Figure 7:
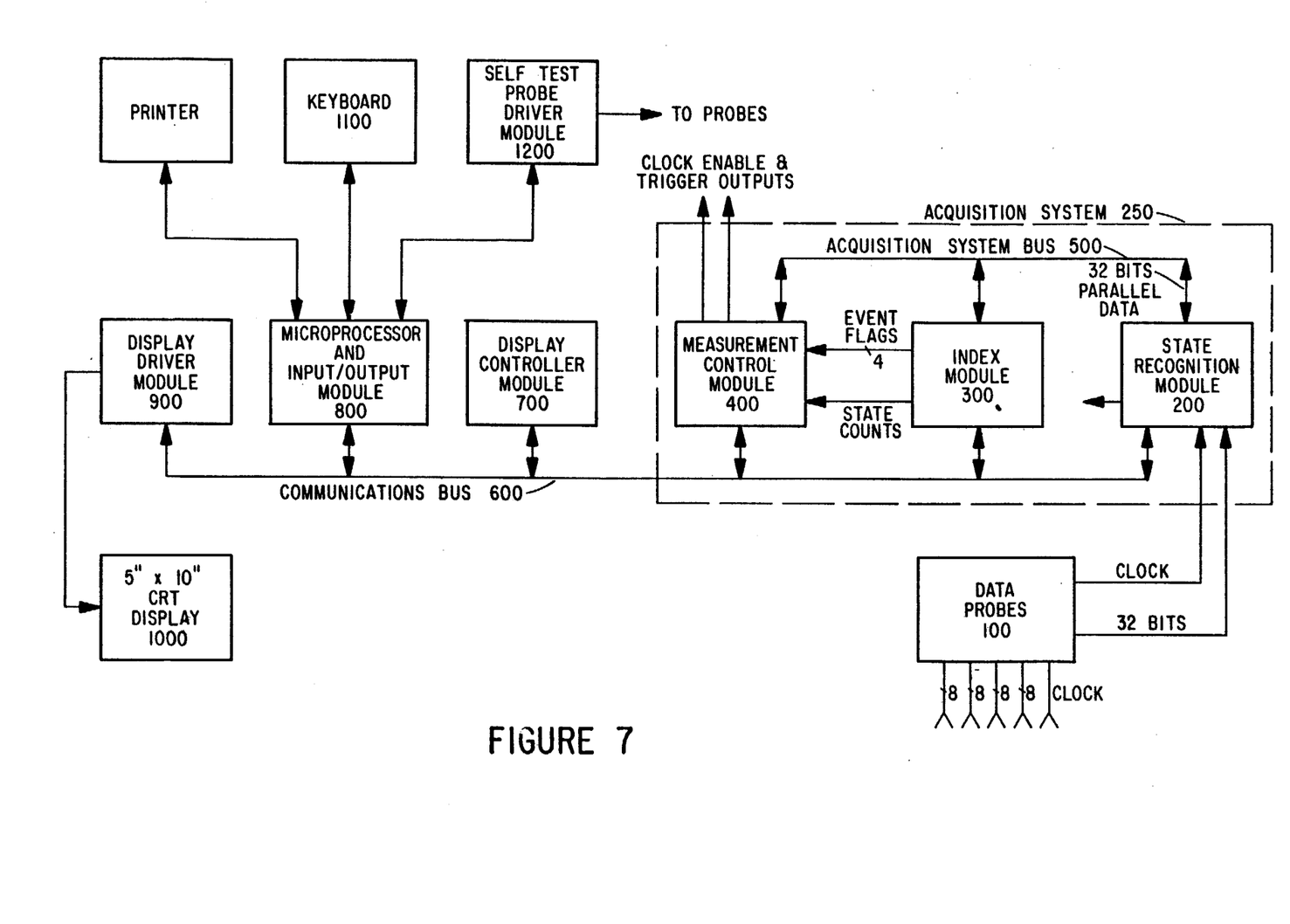
FIG. 7 illustrates a block diagram of the present invention.

Input states are sensed through 32 high impedance variable threshold data probes at rates up to 10 MHz. The data probes 100, illustrated in FIG. 7, are segmented into four 8 bit data pods and a fifth pod for clock sensing. Each pod may be preset to TTL logic threshold or variably adjusted in the range of +10 to −10 volts to interpret input logic levels.

The 32 input data channels and the clock signal from the data probes 100 are input to the state recognition module 200. An internal sampling clock is generated in response to the selected clock slope, the input data signals are compared to the selected threshold voltages and interpreted, and the data signals are latched in response to occurrences of the internal sampling clock. The state recognition module 200 outputs the sampled state to the high speed acquisition system bus 500. The index module 300 accesses the sampled state on the acquisition system bus 500, compares the sampled sampling clock. The state to the selected state conditions and determines the trace position, selective storage events and state count events. The measurement control module 400 also accesses the acquisition system bus 500 and stores state or time counts and sampled data states in response to the events detected by the index module 300.

Figure 8:
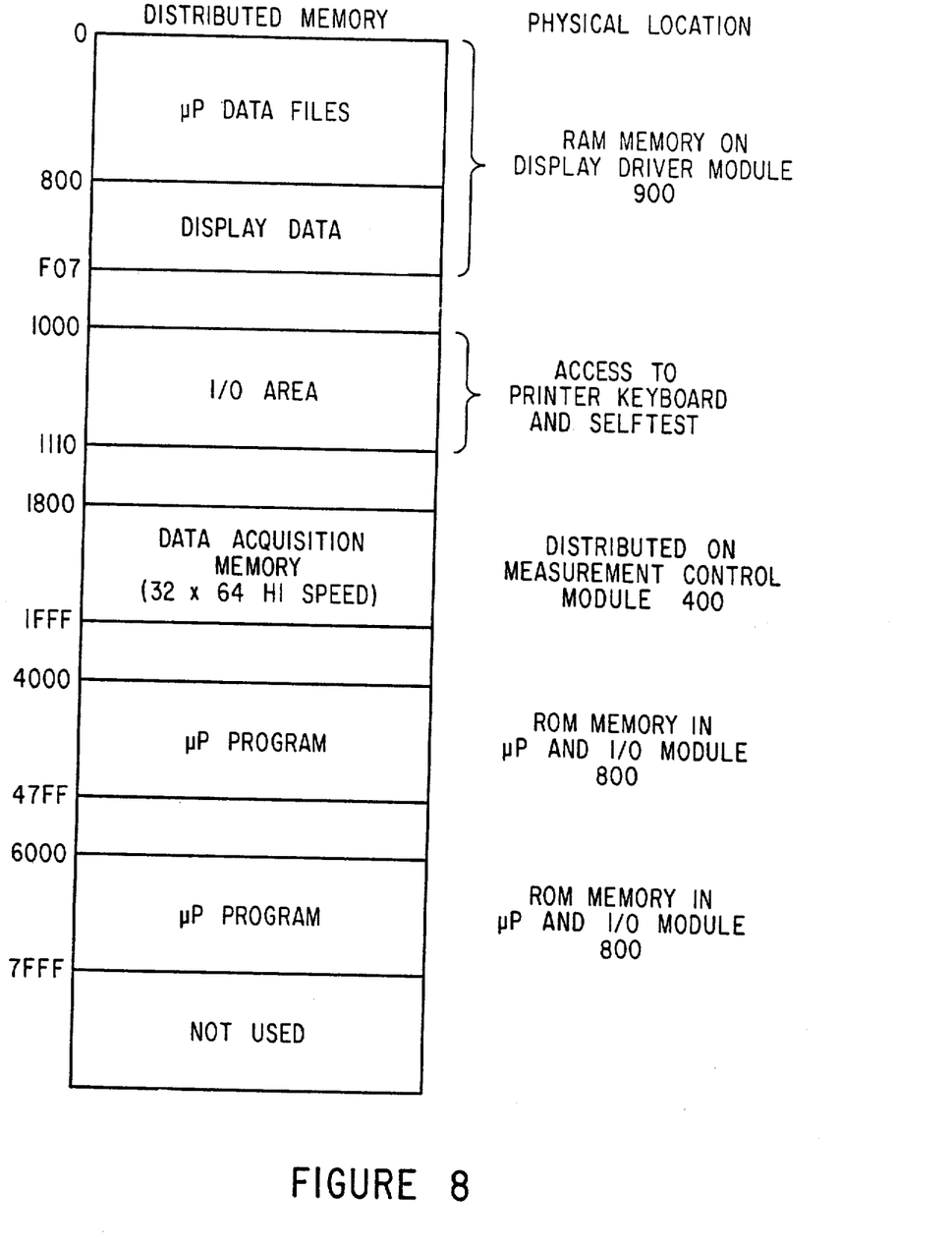
FIG. 8 illustrates the distributed memory addressing of the present invention.
Figure 9:
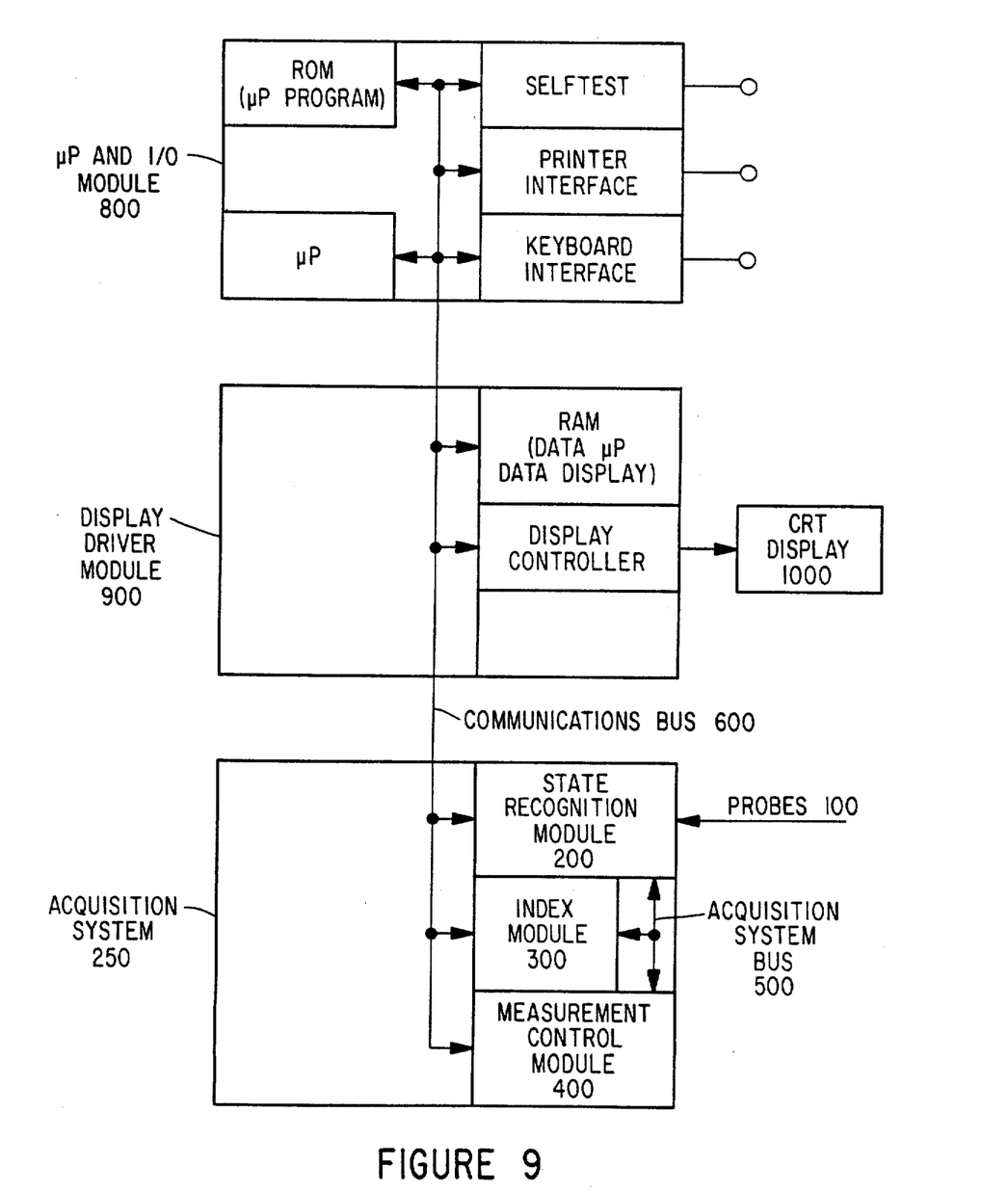
FIG. 9 illustrates the relationship between physical and logical addresses of the distributed memory of FIG. 8.

The modules of the acquisition system 250 communicate with other system modules via the communications bus 600, which prevides a means for addressing selected modules and for transferring selected data. The entire system functions as a distributed memory, as illustrated in FIG. 8. For instance, addresses between 1800 and 1FFF on the communications bus 600 access the state count measurements and the sampled data states stored in the measurement control module 400 memories. FIG. 9 shows another representation of the system architecture, illustrating the relationship between the physical couplings of FIG. 7 and the logical addresses of FIG. 8.

Figure 10:
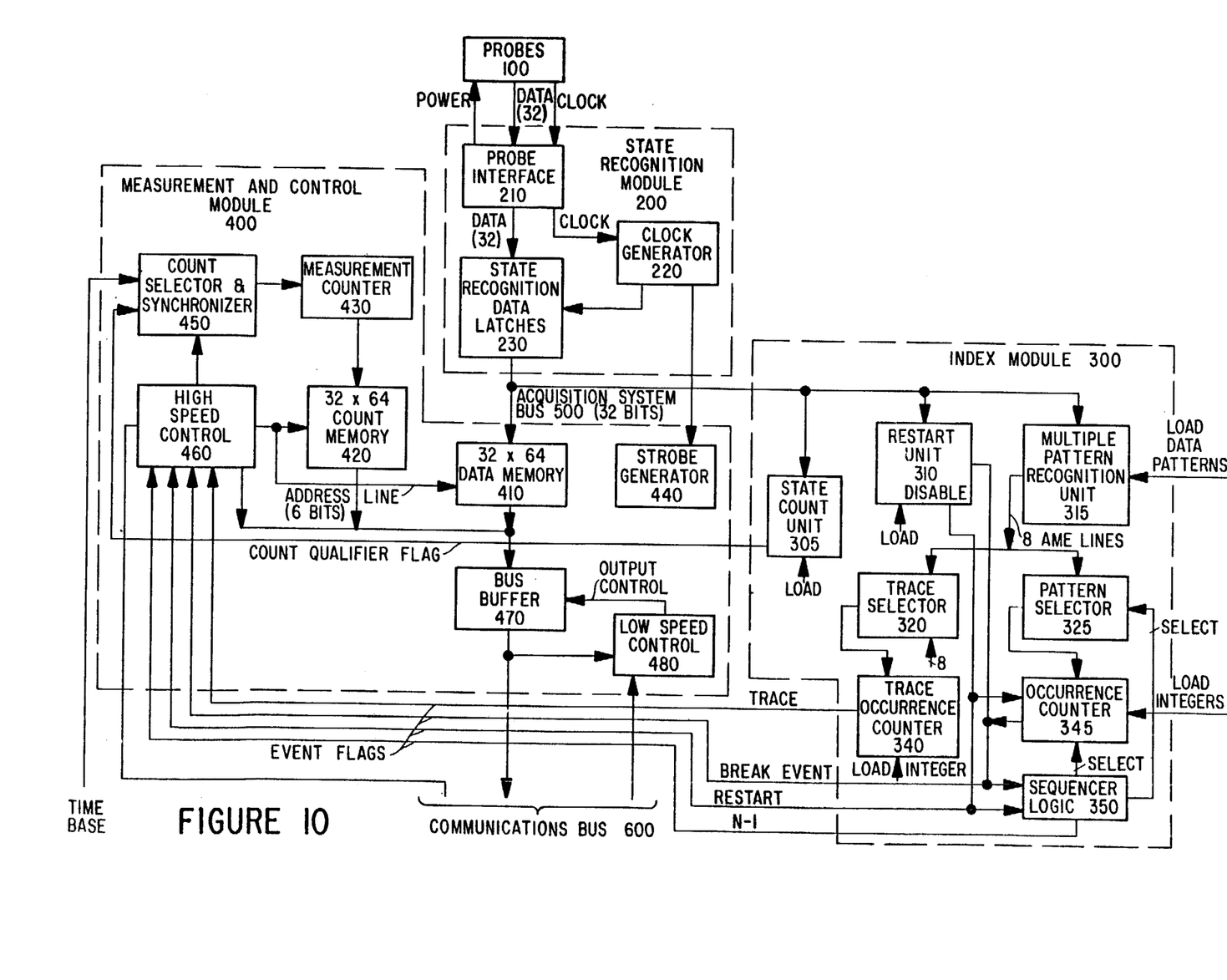
FIG. 10 is a block diagram of the acquisition system.
Figure 11:
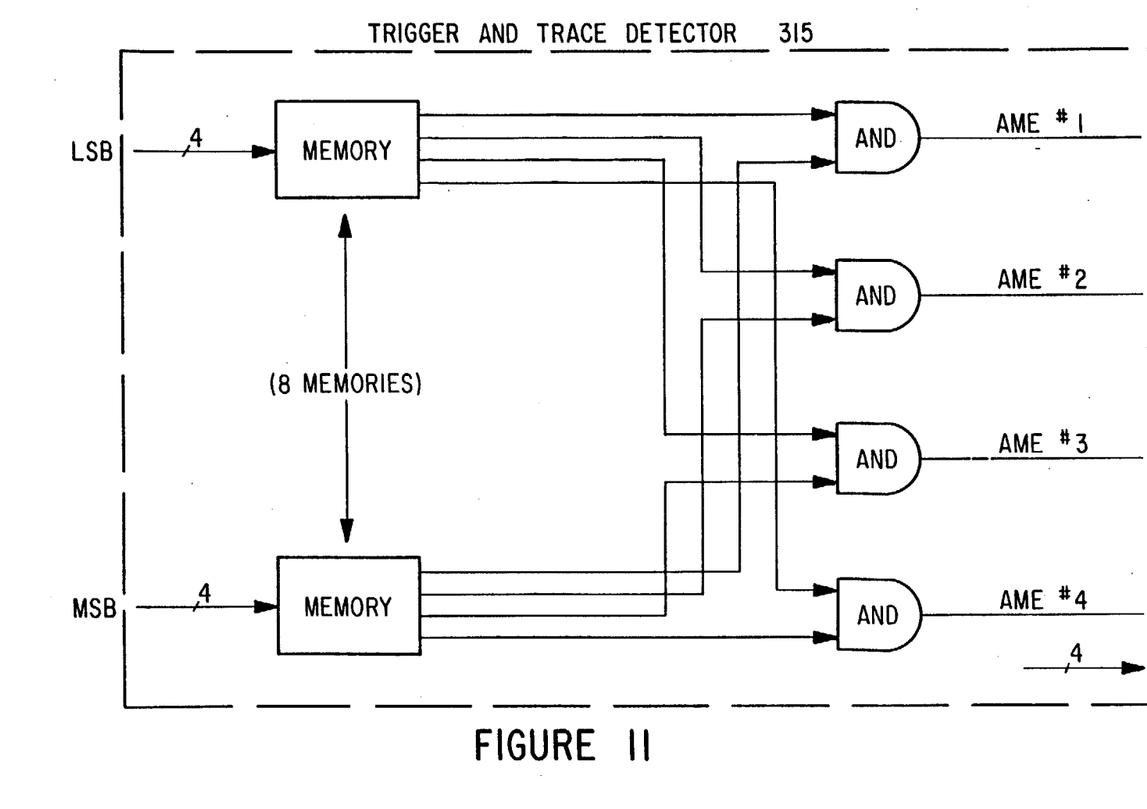
FIG. 11 illustrates a multiple pattern recognition unit.
Figure 12:
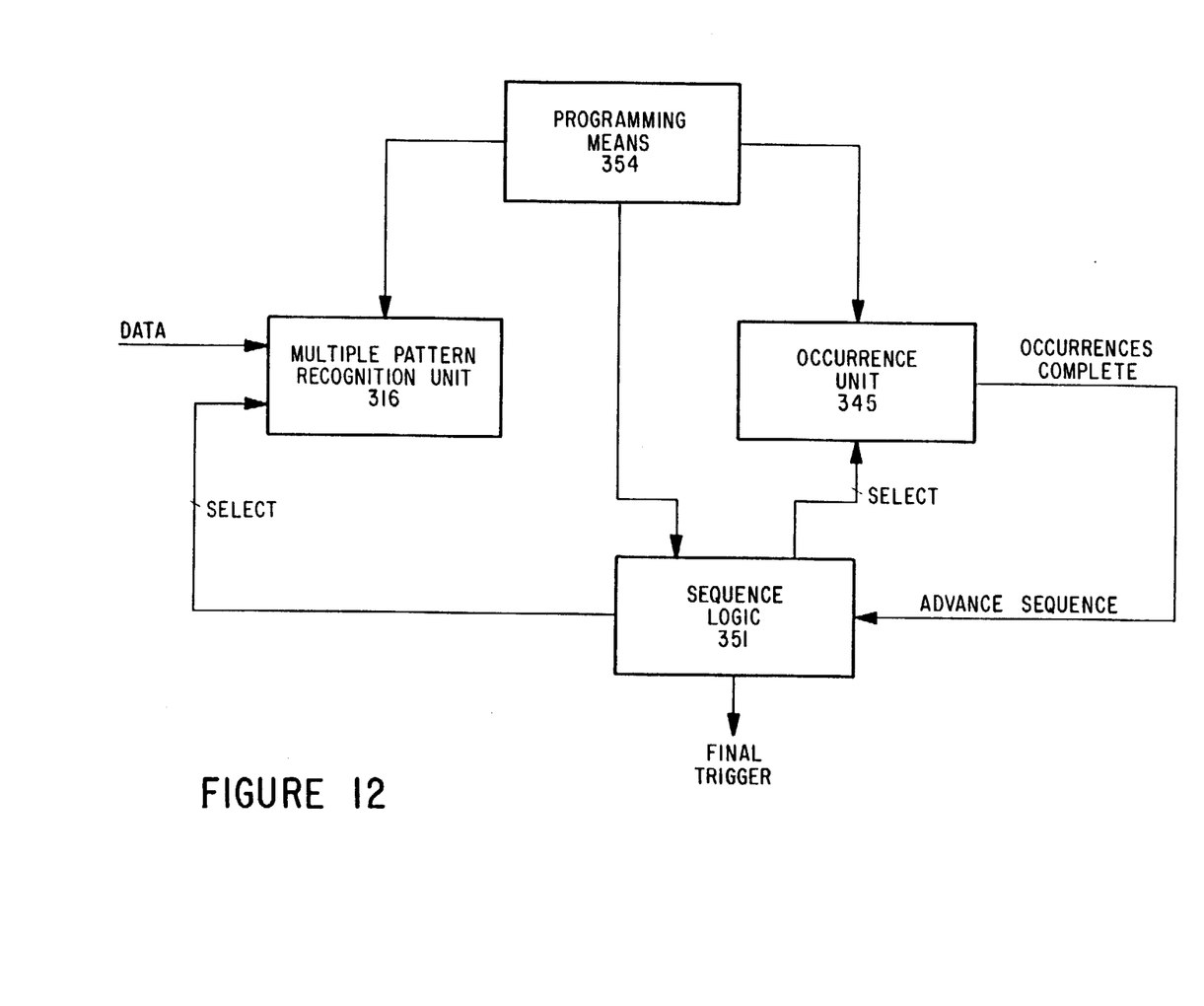
FIG. 12 illustrates a simplified sequential triggering circuit.

Referring to FIG. 10, the index module 300 detects the trace position by first comparing the sampled state on the acquisition system bus 500 with a qualifier state condition stored in the multiple pattern recognition unit 315. The multiple pattern recognition unit 315 comprises a digital pattern triggering circuit as described the copending patent application entitled "DIGITAL PATTERN TRIGGERING CIRCUIT", U.S. patent application Ser. No. 743,188 filed Nov. 19, 1976, by WILLIAM A. FARNBACH. As illustrated in FIG. 11, the multiple pattern recognition unit 315 comprises 2 pairs of 8 sixteen by four bit memories providing for the detection of up to eight qualifier state conditions, where each qualifier state condition is identified by a 1, 0, X input, format (in binary). Pattern selector 325 of FIG. 10 selects one of the eight lines output from the multiple pattern recognition unit and passes the selected output to the occurrence counter 345. The occurrence counter 345 counts the occurrences of the selected qualifier state conditions and provides an output in response to counting a specified number of occurrences of the selected qualifier state condition. This output is termed a "break event" and the sequencer logic 350 in response requests the pattern selector 325 to select the next sequential qualifier state condition and requests the occurrence counter 345 to select the corresponding count. The sequencer logic 350 also outputs a "N−1" event flag in response to detection of the occurrence of the "NEXT TO LAST BREAK EVENT". A simplified sequential triggering circuit is illustrated in FIG. 12 where the multiple pattern recognition unit 316 incorporates the functions of the multiple pattern recognition unit 315 and of the pattern selector 325. The sequence logic 351 incorporates the functions of the sequence logic 350 except that the final trigger is output in response to the completion of the state sequence. Another method of implementing the multiple pattern recognition unit 316 would be to have 3 selector bits be the most significant bits in the address, allowing the comparator to sequence through various segments of memory when comparing sequential state conditions of the state sequence.

Referring again to FIG. 10, the selective trace is incorporated in a similar manner except that the trace selector 320 of FIG. 10 can "OR" any combination of the AME lines. A trace occurrence counter 340 outputs a trace event flag upon counting each "nth" "ORED" AME event.

The restart unit 310 causes the sequence logic 350 to restart the satisfaction of the state sequence subsequent to the detection of a selected restart state condition. The restart unit is disabled for the data state corresponding to the detection of a break event by sequencer logic 350 which permits the state sequence to be satisfied without any unspecified intermediate state by setting the restart state condition to "any state".

The state count 305 strobes a counter in the measurement control module 400 each time the selected state condition to be counted is detected.

Figure 13:
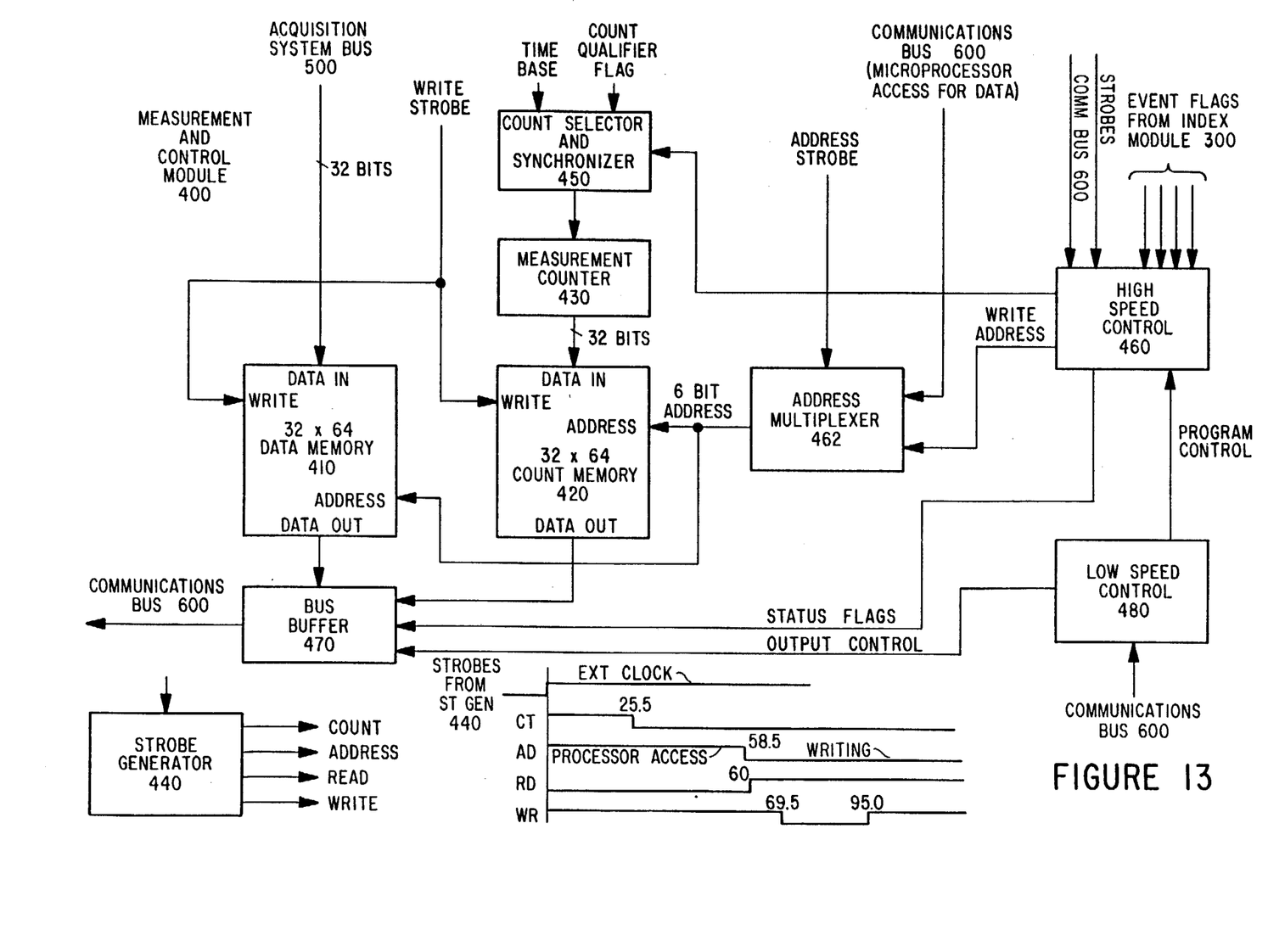
FIG. 13 illustrates the measurement and control module.
Figure 14:
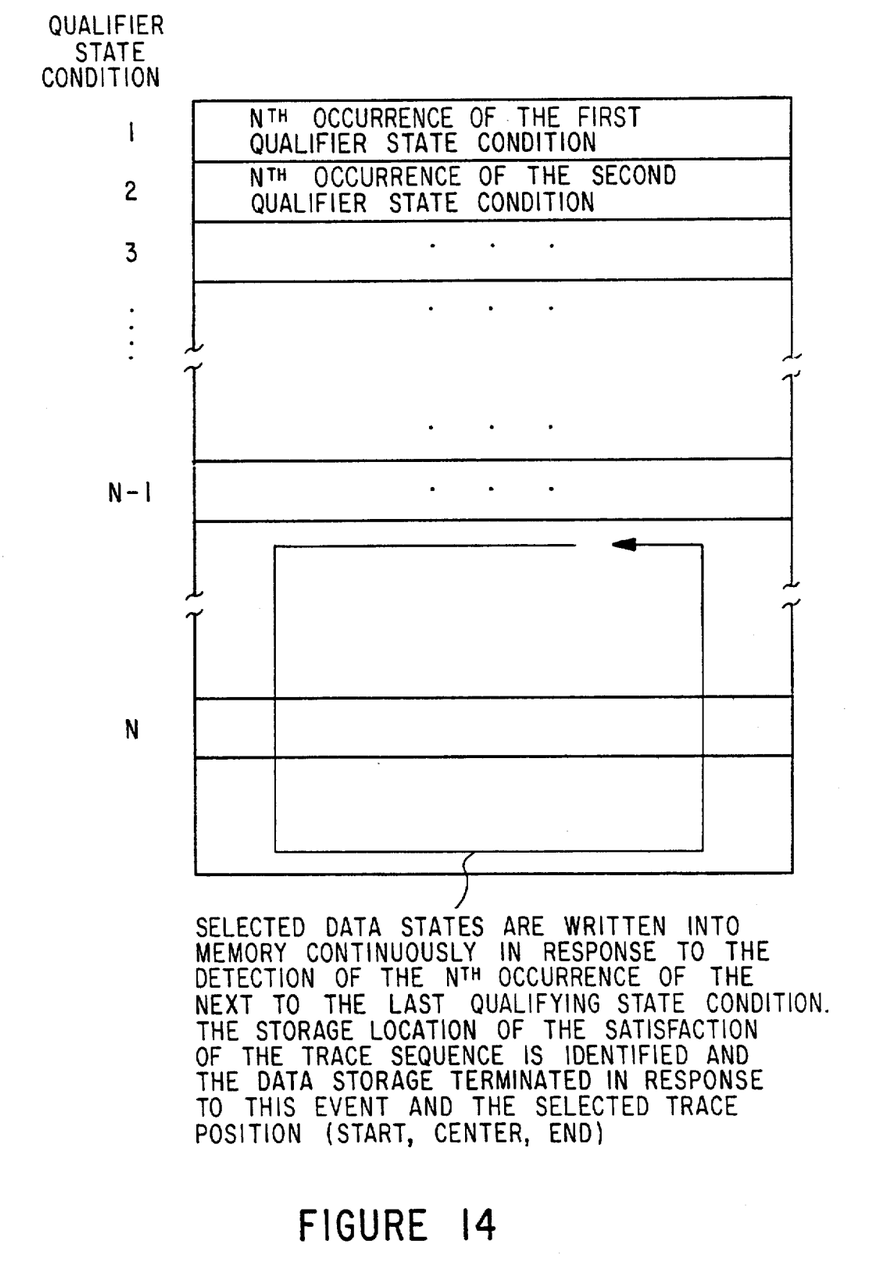
FIG. 14 illustrates the data format of the data memory.

The measurement and control module 400 is illustrated in FIGS. 10 and 13. The event flags from index module 300 are input to the high speed control 460 and determine which sampled states on the acquisition system bus 500 are to be stored. The high speed control 460 addresses the data memory 410 and the count memory 420 accordingly. FIG. 14 illustrates the data format of the data memory 410. The sampled state conditions resulting in break events are sequentially stored in locations 1−(N−1). Upon detection of the "N−1" event flag, sampled state conditions are sequentially written into the remaining memory locations, writing over the oldest data when the memory is filled. The trace position address of the memory location containing the state condition resulting in the final trigger is stored in a register and sampled states are written into the appropriate number of remaining storage locations. For example, if the trace was defined to end on the detection of the trace portion, no sampled states would be written subsequent to the detection of the trace position. The order of occurrence of the stored data is easily reconstructed by recovery of the trace position address appearing on the communications bus 600 as illustrated in FIG. 8. Count selector and synchronizer 450 controls the measurement counter 430, whose contents are stored in count memory 420 upon update of the memory address. The low speed control 480 provides a low speed interface for programming the high speed control 460 and for selecting and latching data for the communications bus 600 interface.

The strobe generator 400, illustrated in FIGS. 10 and 13, generates a sequence of strobes which, when coupled with a series of data latches (not shown) and timing logic (not shown) effectuate the orderly performance of machine tasks. In effect, a number of sampled states are simultaneously in various stages of processing at any one time and are "pipelined" through the required logic blocks.

ACTIVE CHANNEL DETERMINATION

Referring to FIG. 2, the symbol "!" appears below certain assigned input data channels in the format specification. Approximately once every millisecond the sampled state is compared to a "last sample" buffer. The states are exclusively "ORED" to detect any bit changes. The result is then "ANDED" with an activity buffer and the sampled state input to the "last sample" buffer. After 100 samples the activity buffer is sampled for display purposes. Only the assigned channels are displayed. Absence of a "!" indicates low channel activity and is a good indicator that a pod clip may have fallen off during the measurement or the channel is otherwise suspect.

We claim:

1. Apparatus for selecting, storing and displaying a sequence of states occurring in a collection of digital signals, the apparatus comprising:
control means for designating an integer J, an integer K, a trigger state and a qualifier state, and for designating a display format for stored states;
input means coupled to receive the collection of digital signals for performing signal conditioning thereon according to preselected thresholds and polarities to produce a collection of conditioned signals;
trigger means coupled to the collection of conditioned signals and to the control means for producing a trigger signal upon the Jth occurrence of the designated trigger state;
storage qualification means coupled to the collection of conditioned signals and to the control means for producing a qualification signal upon the Kth occurrence of the designated qualifier state;
storage means including a circular buffer, the storage means coupled to the collection of conditioned signals, to the trigger signal and to the qualification signal for storing in consecutive locations in the circular buffer the series of those designated qualifier states producing qualification signals, and upon the occurrence of the trigger signal, storing the designated trigger state in the next consecutive location of the circular buffer;
format conversion means coupled to the control means and to the storage means for generating in response to the display format designated with the control means a collection of formatted signals for each state stored in the storage means, each collection of formatted signals indicative of a partition of the collection of signals into groups, of an ordering of the signals within the groups and of a numerical value for each group according to a pre-selected radix for each group; and
display means coupled to receive the collection of formatted signals, for displaying the sequence of stored states.

2. Apparatus for selecting, storing and displaying a sequence of states occurring in a collection of digital signals, the apparatus comprising:
control means for designating a series of integers $I_1, \ldots, I_n$, an integer J, an integer K, an ordered list of sequence states $SS_1, \ldots, SS_n$, a trigger state and a qualifier state, and for designating a display format for stored states;
input means coupled to receive the collection of digital signals, for performing signal conditioning thereon according to pre-selected thresholds and polarities to produce a collection of conditioned signals;
sequence detection means coupled to the collection of conditioned signals and to the control means, for producing a sequence signal upon the $I_1$th occurrence of the designated sequence state $SS_1$, for producing the sequence signal each time any additional designated sequence state $SS_x$ in the ordered list occurs $I_x$ times, and so on until the production of the sequence signal upon the $I_n$th occurrence of the last designated sequence state $SS_n$, and for producing an arming signal upon the $I_n$th occurrence of the last designated sequence state $SS_n$;
trigger means coupled to the collection of conditioned signals, to the control means and to the arming signal, for producing a trigger signal upon the Jth occurrence of the designated trigger state, each of the J occurrences being subsequent to the occurrence of the arming signal;
storage qualification means coupled to the collection of conditioned signals, to the control means and to the arming signal, for producing a qualification signal upon the Kth occurrence of the designated qualifier state, each of the K occurrences being subsequent to the arming signal;
storage means having a first portion with as many locations as designated sequence states in the ordered sequence thereof, and also having a circular buffer portion, the storage means coupled to the collection of conditioned signals, to the sequence signal, to the trigger signal and to the qualification signal, for storing the series of those sequence states producing the sequence signal into the first portion of the storage means until the occurrence of the arming signal, for storing in consecutive locations in the circular buffer the series of those qualifier states producing the qualification signal, and for storing in the next consecutive location in the circular buffer the trigger state producing the trigger signal;
format conversion means coupled to the control means and to the storage means, for generating in response to the format designated with the control means a collection of formatted signals for each state stored in the storage means, each collection of formatted signals indicative of a partition of the collection of signals into groups, of an ordering of the signals within the groups and of a numerical value for each group according to a pre-selected radix for each group; and display means coupled to receive the collection of formatted signals, for displaying the sequence of stored states.

3. Apparatus as in claims 1 or 2 wherein the control means is additionally for designating an integer L, and further wherein the storage means stores into the L-many consecutive next locations in the circular buffer following the location of the stored trigger state the next L-many qualifier states producing a qualifier signal.

4. Apparatus as in claims 1 or 2 wherein the control means is additionally for designating a reset state, and further wherein the sequence detection means responds to the occurrence of the designated reset state by voiding any previous occurrences of sequence states contributing toward the production of the arming signal, requiring the designated sequence state $SS_1$ to reoccur $I_1$ times, and so on, until the last designated sequence state $SS_n$ occurs $I_n$ times.

* * * * *

UNITED STATES PATENT AND TRADEMARK OFFICE
CERTIFICATE OF CORRECTION

PATENT NO. : 4,301,513
DATED : November 17, 1981
INVENTOR(S) : George A. Haag et al It is certified that error appears in the above—identified patent and that said Letters Patent is hereby corrected as shown below:

Column 4, line 29, "inthe" should be --in the --;

Column 5, lines 47-48, after "sampled" delete "sampling clock. The";

Column 6, line 54, after "count" insert --unit--;

Signed and Sealed this

Sixteenth Day of February 1982

[SEAL]

Attest:

GERALD J. MOSSINGHOFF

*Attesting Officer*  *Commissioner of Patents and Trademarks*